United States Patent [19]
Cooke-Yarborough et al.

[11] 3,805,527
[45] Apr. 23, 1974

[54] STIRLING CYCLE HEAT ENGINES

[75] Inventors: Edmund Harry Cooke-Yarborough; Ernest Franklin; Colin Douglas West, all of Abingdon, England

[73] Assignee: United Kingdom Atomic Energy Authority, London, England

[22] Filed: Dec. 5, 1972

[21] Appl. No.: 312,304

[30] Foreign Application Priority Data
Dec. 9, 1971  Great Britain.................... 57243/71

[52] U.S. Cl..................................... 60/517, 60/523
[51] Int. Cl.............................................. F02g 1/04
[58] Field of Search............................... 60/516–526

[56] References Cited
UNITED STATES PATENTS
2,992,536  7/1961  Carnahan........................... 60/24 X
3,636,719  1/1972  Sato et al............................ 60/24 X

FOREIGN PATENTS OR APPLICATIONS
193,241  6/1906  Germany................................ 60/24

Primary Examiner—Edgar W. Geoghegan
Assistant Examiner—Allen M. Ostrager
Attorney, Agent, or Firm—Larson, Taylor & Hinds

[57] ABSTRACT

A Stirling cycle engine comprises hot and cold variable volume chambers disposed in tandem and having inner, flexible, walls which are interconnected by a tubular regenerator.

The centres of the inner walls of the chambers are concave with their concavities facing away from each other. The centres of the outer walls of the chambers are convex with their convexities projecting into the concavities of the inner walls.

The arrangement keeps the hot and cold chambers well apart without having to provide an extra-long regenerator.

6 Claims, 1 Drawing Figure

PATENTED APR 23 1974 3,805,527
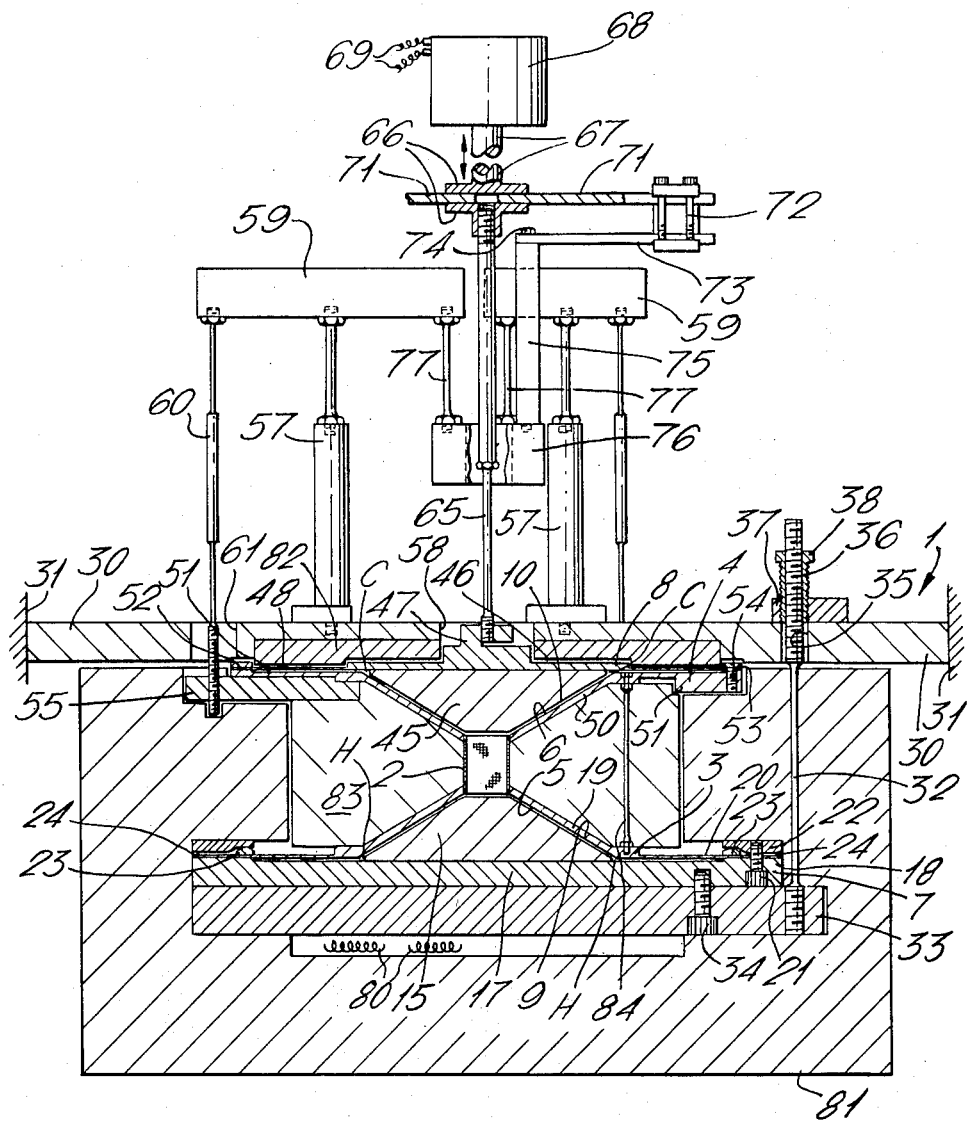

STIRLING CYCLE HEAT ENGINES

This invention relates to Stirling cycle heat engines.

Co-pending Pat. application No. 3128/68 (8023TH), to which reference should be made, relates to a Stirling cycle heat engine provided with hot and cold variable volume chambers inter-communicating through a regenerator, each of the chambers incorporating flexible structure capable of repetitive deflection. Non-positive coupling means are provided to connect side portions of the hot and cold chambers to each other, these side portions being movable by virtue of the flexible structure. The non-positive coupling means transmit force for maintaining reciprocating displacement of gas between the chambers, and the operating components of the engine are tuned to resonate in correct phase relationship in response to the forces transmitted by the coupling means.

FIG. 2 of the drawings accompanying co-pending Application No. 3128/68 shows the regenerator disposed centrally between and attached to a pair of deflectable walls, wherein each wall forms part of either the hot or cold chambers. The walls to which the regenerator is attached are of generally flat form.

It is desired to keep the hot and cold chambers as far apart as possible, in order to reduce thermal losses and thermal stresses. This can be done by providing a regenerator of substantial length but this in turn introduces unacceptable gas flow losses.

According to the present invention, a Stirling cycle heat engine comprises hot and cold variable volume chambers inter-communicating through a regenerator disposed centrally between the chambers and attached to the chambers by way of a pair of movable inner walls each of which forms an inner end part of one of said chambers, the central portion of each inner wall being of concave form with the concavities defined by the central portions of the inner walls facing away from each other, the chambers also comprising a pair of outer walls each of which forms an outer end part of one of said chambers, the central portion of each outer wall being of convex form, with convexities defined by the central portions of the outer walls projecting into the concavities defined by the central portions of the inner walls.

The invention allows much of the hot and cold chambers to be kept well apart without lengthening the regenerator.

An embodiment of the invention will now be described by way of example with reference to the single FIGURE of the accompanying drawing which is a side view in medial section.

With reference to the FIGURE, a Stirling cycle heat engine 1 comprises hot (H) and cold (C) variable volume chambers inter-communicating through a regenerator 2 disposed centrally between the chambers H, C, and attached to the chambers by way of a pair of movable inner walls 3, 4. The inner walls 3, 4 form inner end parts of the hot and cold chambers H, C, respectively. The central portion of each of the inner walls 3, 4 is of concave form with the concavities 5, 6, defined by the central portions of the inner walls facing away from each other. The chambers H, C, also comprise a pair of outer walls 7, 8, which form outer end parts of the hot and cold chambers H, C, respectively. The central portion of each of the outer walls 7, 8 is of convex form with the convexities 9, 10 defined by the central portions of the outer walls projecting into the concavities 5, 6, defined by the central portions of the inner walls 3, 4.

In further detail, the outer wall 7 of the hot chamber H comprises a central frusto-conical hub part 15 attached to a circular backing plate 17 of copper. The backing plate 17 is formed with a raised peripheral portion 18. The inner wall 3 of the hot chamber H comprises a central, funnel-like portion 19 and a thin flexible diaphragm-like outer portion 20. The inner and outer walls 3, 7, are clamped together around their peripheries by a ring of clamping screws 21. The upper ends of the screws 21 screw into a metal ring 22 and between the ring 22 and the outer portion 20 of the inner wall 3 is a clamping ring 23 encircled by a pivot ring 24. The raised peripheral portion 18 locates a gold ring joint fitted in a groove formed in the face of the portion 18. (The gold ring joint and its locating groove are not shown in the drawing). The gold ring joint ensures a good seal with the diaphragm-like oute portion 20 of the inner wall 3. The internal diameter of the clamping ring 23 is such that it is aligned with the raised peripheral portion 18 of the outer wall 7 whereby the outer part of the diaphragm-like outer portion 20 of the inner walls 3 is clamped parallel to the raised peripheral portion 18. The pivot ring 24 permits the ring 22 to ensure that the clamping ring 23 make good contact with the ring 22.

The engine 1 is supported by a steel plate 30 of circular form fixed to rigid supports 31. Three equi-spaced flexure-supports 32 extend downwardly from the plate 30 and their bottom ends are screwed into a copper plate 33. The outer wall 7 of the hot chamber H rests on the plate 33 and is attached thereto by a ring of bolts 34. Screwed upper ends of the flexure-supports 32 pass upwardly through holes 35 in the plate 30 where they are located by screw-threaded sleeves 36 which are in turn screwed into blocks 37 welded to the plate 30. The upper ends of the sleeves 36 are formed with hexagons 38 whereby their axial movement is adjusted by means of a spanner so as to provide accurate positioning of the plate 33. The "hot" end of the engine 1 is thus made stationary.

The outer wall 8 of the cold chamber C comprises a central frusto-conical hub part 45 attached to a circular backing plate 47 having a thin flexible diaphragm-like outer portion 48 of annular form. The inner wall 4 of the cold chamber C comprises a central, funnel-like portion 50 and an outer or flange portion 51 having a raised peripheral part 52. The inner and outer walls 4, 8, are clamped together around their peripheries by a clamping ring 53 secured by clamping screws 54. Epoxy resin is used to seal the raised peripheral part 52 to the outer portion 48 of the outer wall 8. The internal diameter of the clamping ring 53 is such that it is aligned with the internal diameter of the raised peripheral part 52 of the inner wall 5. This ensures that the outer wall 8 is constrained to deflect internally of the raised peripheral part 52.

Three equi-spaced lugs 55 are attached to the undersurface of the flange portion 51 of the inner wall 4 and project radially outwards from that portion. Three equi-spaced columns 57 are fixed to the upper surface of the plate 30 and are distributed around a central hole 58 in that plate. The upper ends of the columns support horizontally-disposed beams 59 and the outer ends of the beams 59 and lugs 55 are rigidly attached to each other by screw-ended rods 60, which project through holes 61 in the plate 30. The rods 60 are subjected alternately to tension and compression and are flexible enough to accommodate angular movement of the beams 59.

An output shaft 65 extends upwardly from the backing plate 47 of the outer wall 8, where it is connected, by means of flanges 66 to an extension shaft 67 carrying a moving iron transducer 68. The transducer 68 has current supply and return leads 69.

The inner ends of three radially-projecting, equi-spaced bars 71 are clamped between the flanges 66 of the shaft 65, 67. The outer ends of the bars 71 are attached by means of clamp and spacer assemblies 72 to the outer ends of bars 73 disposed beneath the bars 71 and in alignment therewith. The inner ends of the bars 73 are secured, by bolts 74, to the upper ends of columns 75. The lower ends of the columns 75 are screwed into a collar 76 through which the output shaft 65 extends with clearance. Screw-ended rods 77 are disposed between the columns and inter-connect the collar 76 with the inner ends of the beams 59. The bars 71, 73 are flexible and form stiff springs. Like the rods 60, the rods 77 are subjected alternately to tension and compression and accommodate angular movement of the beams 59. Heat is applied continuously to the hot chamber H (via the plate 7 and outer wall 7) by way of a pair of co-axially disposed electrical heater elements 80. The elements 80 are housed in fixed insulation 81 enclosing most of the engine. A copper insert 82 of annular form is incorporated in the plate 30 and serves to ensure, as far as possible, radial equalisation of the temperature of the cold outer wall 8. Heat is removed from the cold chamber C by the pumping action resulting from variation in the axial clearance between the face of the cold outer wall 8 and the stationary copper insert 82 adjacent thereto when the outer wall 8 is moved by operation of the engine. This variation in axial spacing forces warm air out of and draws fresh ambient air into the space 46 between the outer wall 8 and insert 82, by way of aligned holes (not shown) in the insert 82 and plate 30.

The annular space between the inner walls 3, 4, is filled in part by the stationary insulation 81 and in part by further insulation 83 which moves axially with the inner walls 3, 4. The cross-sectional area of the movable insulation 83 corresponds to the effective areas of the diaphragm-like outer portions 20, 48, of the inner walls 3, 4. This ensures that when these flexible outer portions 20, 48, deflect (as described hereinafter), any gaps which may occur between these flexing portions and the insulation 83 do not result in undue "pumping" of air, leading to unacceptable heat losses. Stays 84 inter-connect the inner walls 3, 4.

The working spaces of the engine 1 are filled with helium gas and in operation, heat is continuously applied to the hot chamber H by way of the electrical elements 80 and is extracted from the cold chamber C by pumping of air from and to the space 46. The helium gas is caused to move between the hot and cold chambers H, C, in a reciprocating manner and with a cyclic change of temperature and pressure by oscillation of the "displacer" formed by the inter-connected inner walls 3, 4, and the regenerator 2. The cold outer wall 8 is then caused to oscillate by pressure changes occurring in the displaced gas.

The "displacer" 2, 3, 4 and the "cold" outer wall 8 oscillate with a relative difference in phase. The volume variations of the hot and cold chambers H, C, are substantially equal. The gas pressures in each of thse chambers are always substantially equal and rise and fall together as the gas is alternately heated and cooled. Expansion and contraction of the gas is substantially isothermal.

Oscillation of the "cold" outer wall 8 causes oscillation of the power and extension shafts 65, 67. This causes an alternating electrical current to be generated by the transducer 68, which current can be used to perform useful work.

Some of the energy given up in osicllating the shafts 65, 67 needs to be fed back to the engine in order to keep it working by maintaining displacement of gas between the hot and cold chambers H, C. This "feed-back" of energy is achieved by forces derived from the shafts 65, 67 by deflection of the flexible bars 71, 73 being transmitted through the rods 77, the beams 59 and the rods 60, to displace the inner walls 3, 4.

This arrangement can be viewed as a non-positive mechanical coupling. (The presence of the flexible bars 72, 73 renders the coupling non-positive). The drive shaft 65 serves as an actuator, and the flexible bars 72, 73 a flexible connection between this actuator and the mechanical lever system provided by the rods 77, beams 59 and rods 60 whereby oscillation of the actuator (shaft 65) results in displacement of the inner wall 4 and thus, through the interconnecting regenerator 2, the innerwall 3.

Either or both of the shafts 65, 67 may be mass loaded so as to resonate with the gas elasticity and the inner walls 3, 4 or the collar 76 may be mass loaded to resonate with the elasticities of the diaphragm portions 20, 48.

The electrical heating elements 80 may be replaced by a radioisotope heat source or by a source burning non-nuclear fuel. A radioisotope heat source however should give engine 1 a long life and result in it being given little or no attention during its life.

The helium gas may be replaced by hydrogen or any other gas possessing the characteristics of high thermal diffusivity, low viscosity and low friction properties.

The rigidity of the columns 75 may be increased by joining them together at their upper ends. This may be done by means of a metal ring resting on the flexible bars 73 and held tightly in place by the bolts 74.

In one particular form the engine 1 has the following specifications:

| Regenerator 2 | Length—3.16 cm. |
| --- | --- |
| | Cross-sectional area—3 sq.cm. |
| | Stroke—0.9 mm. |
| Outer wall 8 | Stroke—1.4 mm. |
| Inner walls 3, 4 | Diameters—26 cm. |
| Flexible portions diameters—16cm. | 20, 48—internal |
| Greatest distance between inner walls 3, 4—8 cm. | |

We claim:

1. A Stirling cycle heat engine comprising hot and cold variable volume chambers inter-communicating through a regenerator disposed centrally between the chambers and attached to the chambers by way of a pair of movable inner walls each of which forms an inner end part of one of said chambers, the central portion of each inner wall being of concave form with the concavities defined by the central portions of the inner walls facing away from each other, the chambers also comprising a pair of outer walls each of which forms an outer end part of one of said chambers, the central portion of each outer wall being of convex form, with convexities defined by the central portions of the outer walls projecting into the concavities defined by the central portions of the inner walls.

2. A Stirling engine as claimed in claim 1 provided with a stationary structure adjacent the outer wall of the cold chamber so as to define a space therewith open to the atmosphere, wherein in operation of the engine, said outer wall is free to oscillate whereby heat is removed from the cold chamber by a pumping action resulting from variation in clearance between the said outer wall and said stationary structure disposed adjacent thereto.

3. A Stirling engine as claimed in claim 1 wherein, in operation of the engine, the outer wall of the cold chamber is free to oscillate and wherein means are provided connecting the said outer wall with transducer means whereby oscillation of the said outer wall causes said transducer means to generate electrical power.

4. A Stirling engine as claimed in claim 1 wherein one of the outer walls is made stationary and the other of the outer walls is free to oscillate and wherein coupling means operated by oscillation of the said other outer wall are provided to feed back energy into the engine so as to maintain displacement of working fluid between the hot and cold chambers.

5. A Stirling engine as claimed in claim 4 wherein the said coupling means comprise non-positive coupling means.

6. A Stirling engine as claimed in claim 5 wherein the non-positive coupling means comprise actuator means connected to the said other outer wall so as to oscillate therewith, mechanical lever means connected to the inner wall adjacent said other outer wall and a flexible connection between the actuator means and the mechanical lever means whereby oscillation of the actuator means results in displacement of the last-mentioned inner wall by way of said flexible connection and said mechanical lever means.

* * * * *